United States Patent
Chilton

(10) Patent No.: US 6,941,308 B1
(45) Date of Patent: Sep. 6, 2005

(54) METHODS AND APPARATUS FOR ACCESSING A DOUBLY LINKED LIST IN A DATA STORAGE SYSTEM

(75) Inventor: Kendell A. Chilton, Southborough, MA (US)

(73) Assignee: EMC Corporation, Hopkinton, MA (US)

(*) Notice: Subject to any disclaimer, the term of this patent is extended or adjusted under 35 U.S.C. 154(b) by 436 days.

(21) Appl. No.: 09/972,321

(22) Filed: Oct. 5, 2001

(51) Int. Cl.[7] .............................................. G06F 17/30

(52) U.S. Cl. ..................... 707/100; 707/1; 707/102; 711/160; 711/173

(58) Field of Search ................... 707/1–10, 100–104.1, 707/200–206; 711/100, 113–114, 133, 160–163, 711/171–173; 710/1, 52

(56) References Cited

U.S. PATENT DOCUMENTS

| | | | | |
|---|---|---|---|---|
| 4,638,425 | A * | 1/1987 | Hartung | 711/133 |
| 5,884,098 | A * | 3/1999 | Mason, Jr. | 710/52 |
| 5,950,211 | A * | 9/1999 | Shealy | 707/204 |
| 6,269,431 | B1 * | 7/2001 | Dunham | 711/162 |
| 6,353,878 | B1 * | 3/2002 | Dunham | 711/162 |
| 6,581,063 | B1 * | 6/2003 | Kirkman | 707/100 |

FOREIGN PATENT DOCUMENTS

EP          0114190 A2 *   1/1984   ............ G11C 9/06

OTHER PUBLICATIONS

Kendell A. Chilton; "A Data Storage System Having an Improved Memory Circuit Board"; Filed on Oct. 5, 2001.
Kendell A. Chilton; "Methods and Apparatus for Accessing Data Elements Using Improved Hashing Techniques"; Filed on Oct. 5, 2001.

* cited by examiner

Primary Examiner—Shahid Alam
Assistant Examiner—Jean Bolte Fleurantin
(74) Attorney, Agent, or Firm—David E. Huang, Esq.

(57) ABSTRACT

A data storage system has storage devices, a processor which is configured to move data to and from the storage devices, and a bus coupled to the processor. The data storage system further includes a memory board having (i) an interface which couples to the bus, (ii) memory which is configured to store a doubly linked list data structure, and (iii) a memory board control circuit coupled to the interface and the memory. The memory board control circuit is capable of accessing the data structure. In particular, the memory board control circuit is configured to receive a modify command from the processor through the interface and the bus, atomically modify the data structure in accordance with the modify command, and provide a result to the processor through the interface and the bus in response to modifying the data structure.

34 Claims, 9 Drawing Sheets

METHODS AND APPARATUS FOR ACCESSING A DOUBLY LINKED LIST IN A DATA STORAGE SYSTEM

BACKGROUND OF THE INVENTION

A typical data storage system includes processing circuitry and a set of disk drives. In general, the processing circuitry stores data in the set of disk drives and retrieves data from the set of disk drives on behalf of one or more external hosts. The processing circuitry typically includes a set of processor circuit boards (or simply CPU boards), a set of memory circuit boards (or simply memory boards), and an interconnect (e.g., a backplane) that enables the CPU boards and the memory boards to communicate with each other. The memory boards provide volatile storage space which the CPU boards use as both input/output (I/O) memory and system memory. The I/O memory, which is commonly referred to as the I/O cache, temporarily stores data received from an external host for subsequent storage in the set of disk drives, as well as temporarily stores data read from the set of disk drives for subsequent transmission to an external host. The system memory stores key memory constructs (i.e., data structures) of the data storage system.

One memory construct is the Least-Recently-Used (LRU) queue which includes a list of LRU entries identifying blocks (e.g., 512 bytes) of the I/O cache for storing data. The LRU queue is a data structure which is typically arranged as a doubly linked list that identifies the I/O cache blocks in order from the most recently used to the least recently used. That is, the LRU queue includes a series of LRU entries beginning with a first LRU entry identifying the most recently used block of the I/O cache, followed by a second LRU entry identifying the next most recently used block, and so on. The series of LRU entries ends with a last LRU entry identifying the least recently used block of the I/O cache.

Typically, when an external host sends a read request to the data storage system (e.g., a request to read cached data), a CPU board responds to the request by, among other things, (i) transferring a copy of the requested data from a block of the I/O cache to the host and (ii) updating the LRU queue. To update the LRU queue, the CPU board performs, through the interconnect, a series of load and store operations on the memory board storing the LRU queue. In particular, the CPU board locates the LRU entry identifying the I/O cache block containing the data and moves, or promotes, that entry to the beginning of the LRU queue to indicate that the block is now the most recently used block in the I/O cache. Further details of how the CPU board updates the LRU queue will now be provided.

Recall that the LRU queue is a doubly linked list having a series of LRU entries. Moving a particular LRU entry to the beginning of the LRU queue typically involves multiple LRU operations. First, a CPU board identifies the adjacent preceding LRU entry and the adjacent succeeding LRU entry by reading forward and reverse pointers of the particular LRU entry. Second, the CPU board removes the particular LRU entry from the series of LRU entries by (i) reading, modifying and storing the forward pointer of the adjacent preceding LRU entry and (ii) reading, modifying and storing the reverse pointer of the adjacent succeeding LRU entry. Third, the CPU board finds the first LRU entry in the LRU queue by reading a head pointer of the LRU queue. Next, the CPU board adds the particular LRU entry to the beginning of the LRU queue by reading, modifying and storing the reverse pointer of first LRU entry, and modifying and storing the forward and reverse pointers of the particular LRU entry (the reverse pointer of the particular LRU entry can be set to NULL or set to point to the particular LRU entry itself since it is now the beginning entry). Finally, the CPU board indicates that the particular LRU entry is now at the beginning of the LRU queue for a subsequent LRU access operation by modifying the head pointer of the LRU queue. The block identified by the particular LRU entry is now identified as the most recently used block of the I/O cache.

When a host sends a request to write data, a CPU board typically responds by (i) finding an available I/O cache block for storing the data, (ii) placing the data into that block, and (iii) updating the LRU queue. The process of finding an available block typically involves the CPU board accessing the ending entry in the LRU queue to identify the least recently used block of the I/O cache. The process of updating the LRU queue typically involves the CPU board moving the ending entry of the LRU queue (i.e., the entry identifying the block that now contains the written data) to the beginning of the LRU queue thus indicating that the block containing the data is now the most recently used block of the I/O cache. Moving the ending entry of the LRU queue involves performing a series of read-modify-write operations on the LRU queue in a manner similar to that just described for reading an I/O cache block.

When the data storage system includes multiple CPU boards that can concurrently operate on behalf one or more external hosts (e.g., to increase data storage system throughput), the multiple CPU boards must share access to the LRU queue. To this end, the data storage system typically employs data structure sharing techniques (i.e., techniques for coordinating access to a shared data structure) in order to prevent the CPU boards from inadvertently accessing the LRU queue simultaneously. For example, suppose that a particular CPU board wishes to identify the least recently used block in the I/O cache and store data in that block on behalf of a host. To this end, the CPU board typically locks the LRU queue, identifies the least recently used block based on the last entry in the LRU queue, stores the data in that block, moves the last entry in the LRU queue to the beginning of the LRU queue so that the LRU queue now identifies that block as the most recently used block, and then unlocks the LRU queue. Such locking and unlocking of the LRU queue prevents another CPU board from concurrently accessing the LRU queue, and typically involves the use of a standard locking mechanism (e.g., semaphores, bit test-and-set operations, etc.). Accordingly, conflict situations (e.g., multiple CPU boards attempting to store data in the same I/O cache block, one CPU board writing data while another CPU reads data from the same block, etc.) are avoided.

SUMMARY OF THE INVENTION

Unfortunately, there are deficiencies to the above-described conventional approach for coordinating access to the LRU queue among multiple CPU boards within a data storage system. For example, when a CPU board accesses a block of the I/O cache, the CPU board updates the LRU queue to indicate that the accessed I/O cache block is now the most recently used block. This update of the LRU queue involves several communications (e.g., at least 10) between the CPU board and the memory board containing the LRU queue through the interconnect that couples the CPU board to the memory board. In particular, there is usually one communication for reading the forward and reverse pointers of the particular LRU entry identifying the accessed I/O cache block in order to identify the adjacent preceding and adjacent succeeding LRU entries, two communications for reading the adjacent preceding LRU entry and setting its forward pointer to point to the adjacent succeeding LRU entry, two communications for reading the adjacent succeeding LRU entry and setting its reverse pointer to point to the adjacent preceding LRU entry, one communication to read the header pointer to find the beginning of the LRU queue, two communications for reading and setting the forward and reverse pointers of the old beginning LRU entry, one communication for setting the forward and reverse pointers of the particular LRU entry that identifies the accessed I/O cache block (i.e., the new beginning LRU entry), and one communication for setting the header pointer to point to the particular LRU entry.

Each communication through the interconnect typically requires separately arbitrating for use of the interconnect (i.e., bus arbitration). Such bus arbitration and other contention (e.g., other devices using the bus) causes the communications to incur latencies (i.e., waiting for bus access). Accordingly, the above-described conventional approach to accessing the LRU queue suffers from relatively slow response time, and a relatively low limit to the number of data access operations that can be performed per second.

Furthermore, when the data storage system includes multiple CPU boards which contend for access to the LRU queue, the use of a locking mechanism (e.g., semaphores, test-and-set resources, etc.) to prevent LRU queue sharing conflicts requires the expenditure of additional resources (e.g., memory, processing time, etc.) thus adding further delays and further limiting the number of data access operations that can be performed per second.

The above-described LRU queue access operations typically occur regularly and frequently within a conventional data storage system. Accordingly, the burden of requiring so many communications for a signal LRU update operation (e.g., moving an LRU entry to the beginning of the LRU queue) can substantially affect the performance of the conventional data storage system.

In contrast to the above-described conventional approach to updating the LRU queue in a memory board, the invention is directed to techniques for accessing a doubly linked list data structure (e.g., an LRU queue) in a memory board of a data storage system by modifying the data structure in an atomic manner (e.g., by performing multiple operations on the LRU queue within the memory board to update the LRU queue in response to a single command or instruction as one operation that does not overlap other contexts). Such operation can result in a reduction in the number of communications between a processor board and the memory board through an interconnect thus reducing bus contention, lowering latencies, and alleviating the need for shared data structure locking overhead. As a result, the techniques of the inventions permit quicker response times and an increase in the number of data access operations that can be performed per second.

One arrangement of the invention is directed to a data storage system having a set of storage devices, a processor (e.g., a CPU board) which is configured to move data to and from the set of storage devices, and a bus (e.g., a backplane) coupled to the processor. The data storage system further includes a memory board having (i) an interface which couples to the bus, (ii) memory which is configured to store a doubly linked list data structure (e.g., an LRU queue), and (iii) a memory board control circuit coupled to the interface and the memory. The memory board control circuit is capable of accessing the doubly linked list data structure. In particular, the memory board control circuit is configured to receive a modify command from the processor of the data storage system through the interface and the bus, atomically modify the doubly linked list data structure in accordance with the modify command, and provide a result to the processor through the interface and the bus in response to modifying the data structure. Accordingly, modification of the data structure can occur through a single communication between the processor and the memory board, rather than in multiple communications as with the earlier-described conventional approach to accessing the LRU queue. As a result, there is less bus contention (i.e., less arbitrations and uses of the interconnect) and thus faster overall response time.

In one arrangement, the data structure is shared (e.g., accessible among multiple processor boards). Since the modify operation occurs atomically, there is no locking mechanism required to modify the data structure. Accordingly, there is no required locking overhead and the processor is freed to perform other operations.

In one arrangement, the doubly linked list data structure includes multiple entries, and the memory board control circuit is configured to manipulate an entry of the data structure (e.g., remove the entry, add the entry, move the entry, etc.) in accordance with the modify command in order to atomically modify the data structure. When the data structure is an LRU queue, the movement of the entry atomically alleviates the need for multiple communications between the CPU board and the memory board which could otherwise reduce response time and clog resources of the data storage system (e.g., which could otherwise increase bus contention, require locking overhead, etc.).

In one arrangement, the memory board control circuit is configured to atomically modify the doubly linked list data structure by performing a series of individual transactions on the doubly linked list data structure. In this arrangement, the memory board control circuit is further configured to provide, as the result, a series of transaction outputs respectively corresponding to the series of individual transactions. Preferably, the series of transaction outputs provided by the memory board control circuit includes a first transaction output and a second transaction output, and the processor is configured to (i) generate a pseudo transaction output based on the first transaction output and (ii) compare the pseudo transaction output to the second transaction output in order to error check operation of the memory board.

The features of the invention, as described above, may be employed in data storage systems, devices and procedures as well as other computer-related components such as those of EMC Corporation of Hopkinton, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques for accessing a doubly linked list data structure (e.g., an LRU queue) in a memory circuit board of a data storage system by modifying the data structure in an atomic manner (e.g., by performing a series of tasks or transactions on the LRU queue in response to a single command or instruction). Such operation can occur in response to a single communication between a processor circuit board and the memory circuit board through a set of buses (e.g., a backplane interconnect) thus reducing bus contention (e.g., with fewer communications through the set of buses), and lowering delays (e.g., with fewer bus arbitrations), vis-á-vis conventional approaches to accessing an LRU queue using many communications. Furthermore, if the data structure is a shared data structure, no locking mechanism is required due to the atomicity of the modify operation. Accordingly, these embodiments of the invention provide faster response times and use less processor time, thus permitting more data access operations to be performed per second.

Figure 1:
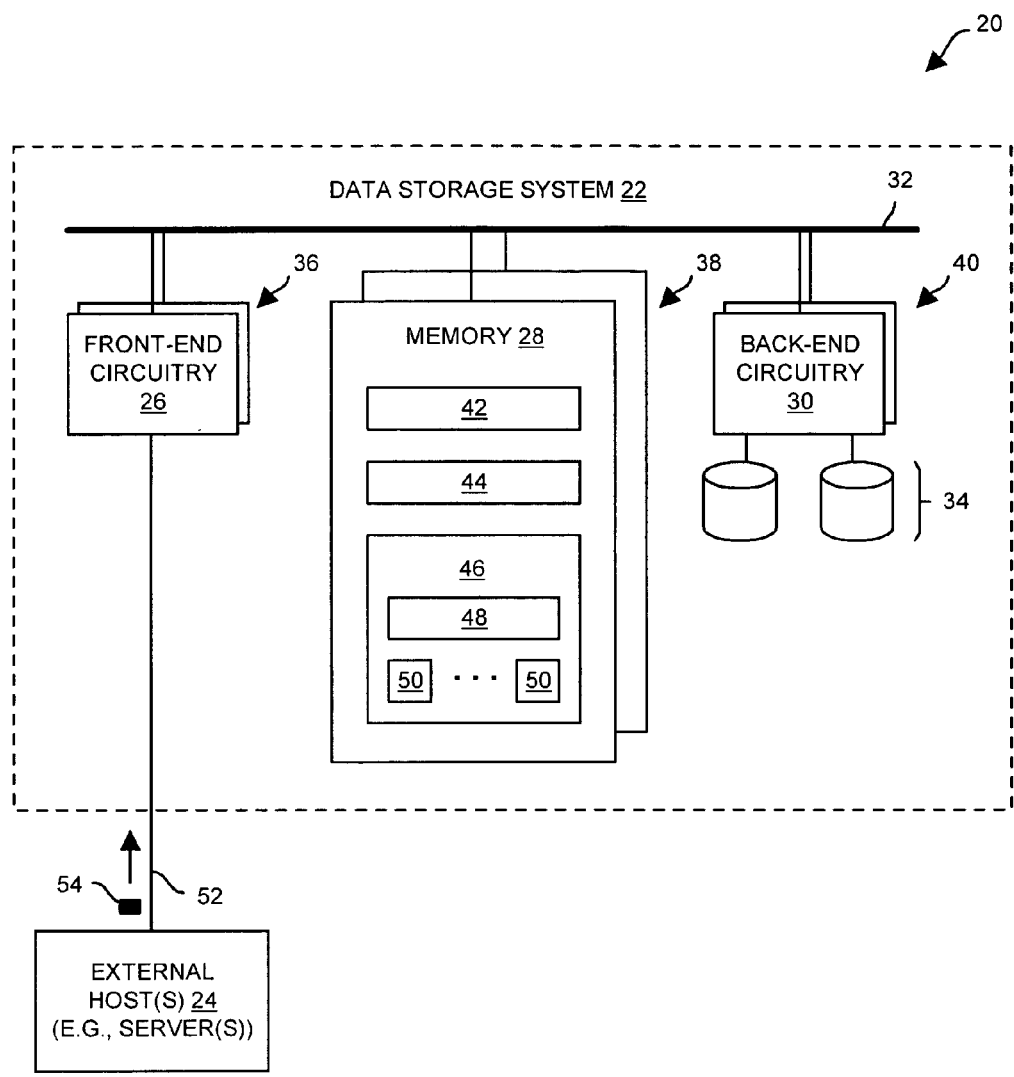
FIG. 1 is a block diagram of a data storage system which is suitable for use by the invention.

FIG. 1 shows a data storage network 20 which is suitable for use by the invention. The data storage network 20 includes the data storage system 22 and one or more external hosts 24. The data storage system 22 includes front-end circuitry 26, memory 28, back-end circuitry 30, a set of buses 32 and a set of storage devices 34. The front-end circuitry 26 includes a set of processor circuit boards 36 (or simply processors boards 36) having processing circuitry (e.g., a processor) for operating on behalf of the external hosts 24. Similarly, the memory 28 includes a set of memory circuit boards 38 (or simply memory boards 38). Additionally, the back-end circuitry 30 includes a set of processor boards 40 (or simply processors 40) having processing circuitry for moving data between the memory 28 and the set of storage devices 34 (e.g., disk drives, tape drives, etc.). The set of buses 32 (e.g., a backplane interconnect) enables the processor boards 36, 40 of the front-end circuitry 26 and the back-end circuitry 30 to communicate with the memory boards 38.

In one arrangement, Symmetrix™ 5.0 front-end director boards are suitable for use as the front-end processor boards 36, and Symmetrix™ 5.0 back-end director boards are suitable for use as the back-end processor boards 40. Symmetrix™ is a line of data storage systems provided by EMC Corporation of Hopkinton, Mass.

Each memory board 38 is essentially a "smart" memory board because it is capable of expanding the power of the processor boards 36, 40 (e.g., reducing and/or minimizing the number of communications from the processor boards 36, 40 to perform particular operations). Each memory board 38 includes an interface 42 which couples to the set of buses 32, a memory board control circuit 44, and memory 46 which provides storage space.

Some of the storage space operates as system memory for the data storage system 22. In particular, some of the storage space stores a doubly linked list shared data structure 48. Additionally, some of the storage space operates as an I/O cache for storing, at least temporarily, portions 50 of data (e.g., blocks) en route from the external hosts 24 to the set of storage devices 34, or en route the set of storage devices 34 to the external hosts 24. The memory board control circuit 44 is capable of modifying the doubly linked list shared data structure 48 in an atomic manner in response to a command from either a processor board 36 of the front-end circuitry 26, or a processor board 40 of the back-end circuitry 30. Such operation minimizes the amount of communication required between that processor board 36, 40 and the memory board 38 through the set of buses 32, and alleviates the need for a locking mechanism to avoid access conflicts. Accordingly, delays due to bus arbitration/contention and data structure locking are minimized, and the processing circuitry of the data storage system 22 (i.e., the front-end circuitry 26 and the back-end circuitry 30) is free to perform more operations per second. Further details of the data storage system 22 will be provided with reference to FIG. 2.

Figure 2:
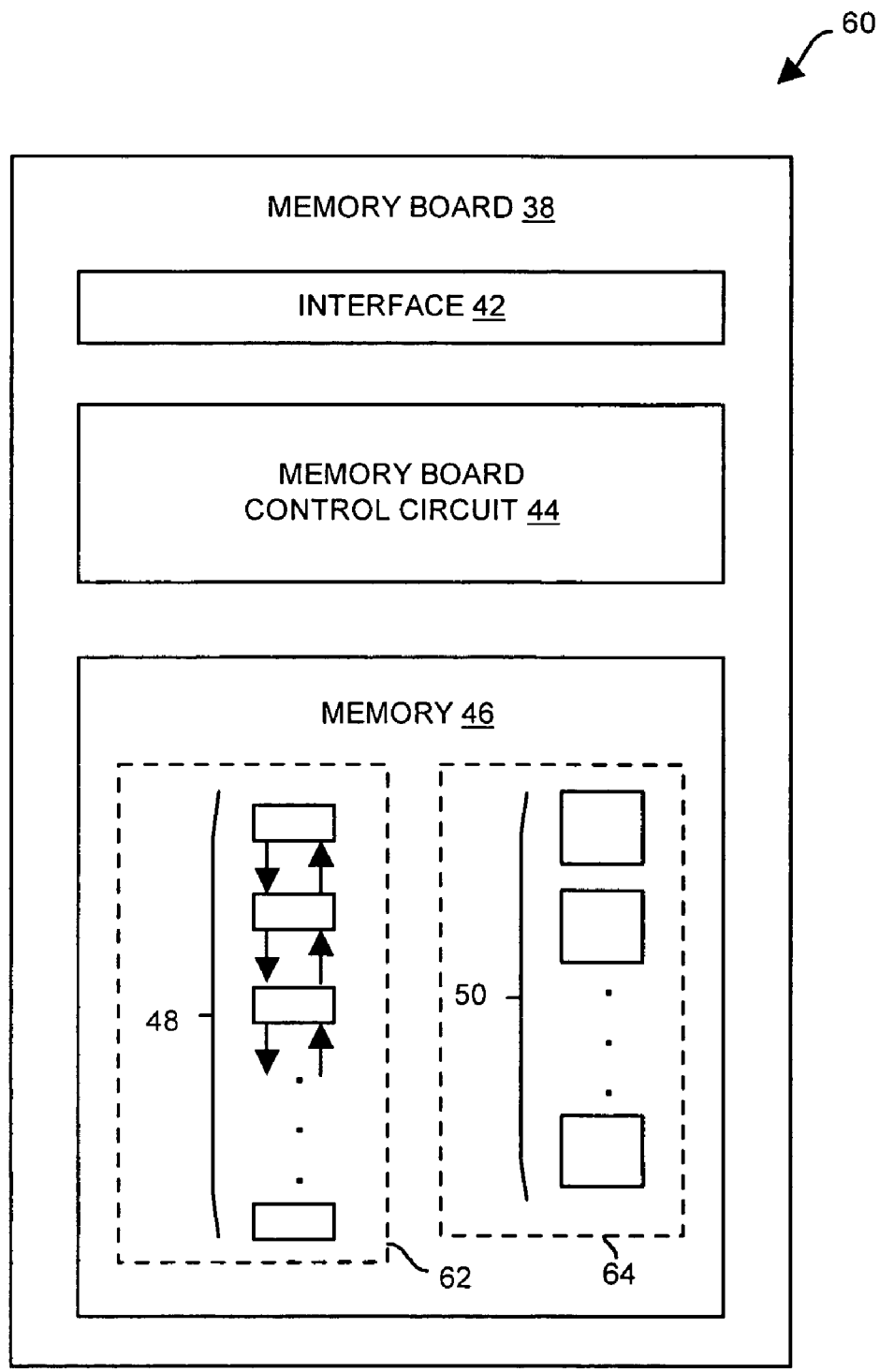
FIG. 2 is a block diagram of a memory board of the data storage system of FIG. 1.

FIG. 2 shows a block diagram 60 of a memory board 38 of the data storage system 22 of FIG. 1. As mentioned above, each memory board 38 includes an interface 42, a memory board control circuit 44, and memory 46. It should be understood that the memory 46 of each memory board 38 can provide storage space for system memory, I/O memory, or both system memory and I/O memory. By way of example only, the memory 46 of the particular memory board 38 of FIG. 2 includes both system memory 62 for storing the doubly linked list shared data structure 48 (also see FIG. 1), and I/O memory 64 for storing portions 50 of data. The I/O memory 64 provided by each memory board 38 forms the I/O cache for the data storage system 22. Further details of the invention will now be provided with reference to FIG. 3.

Figure 3:
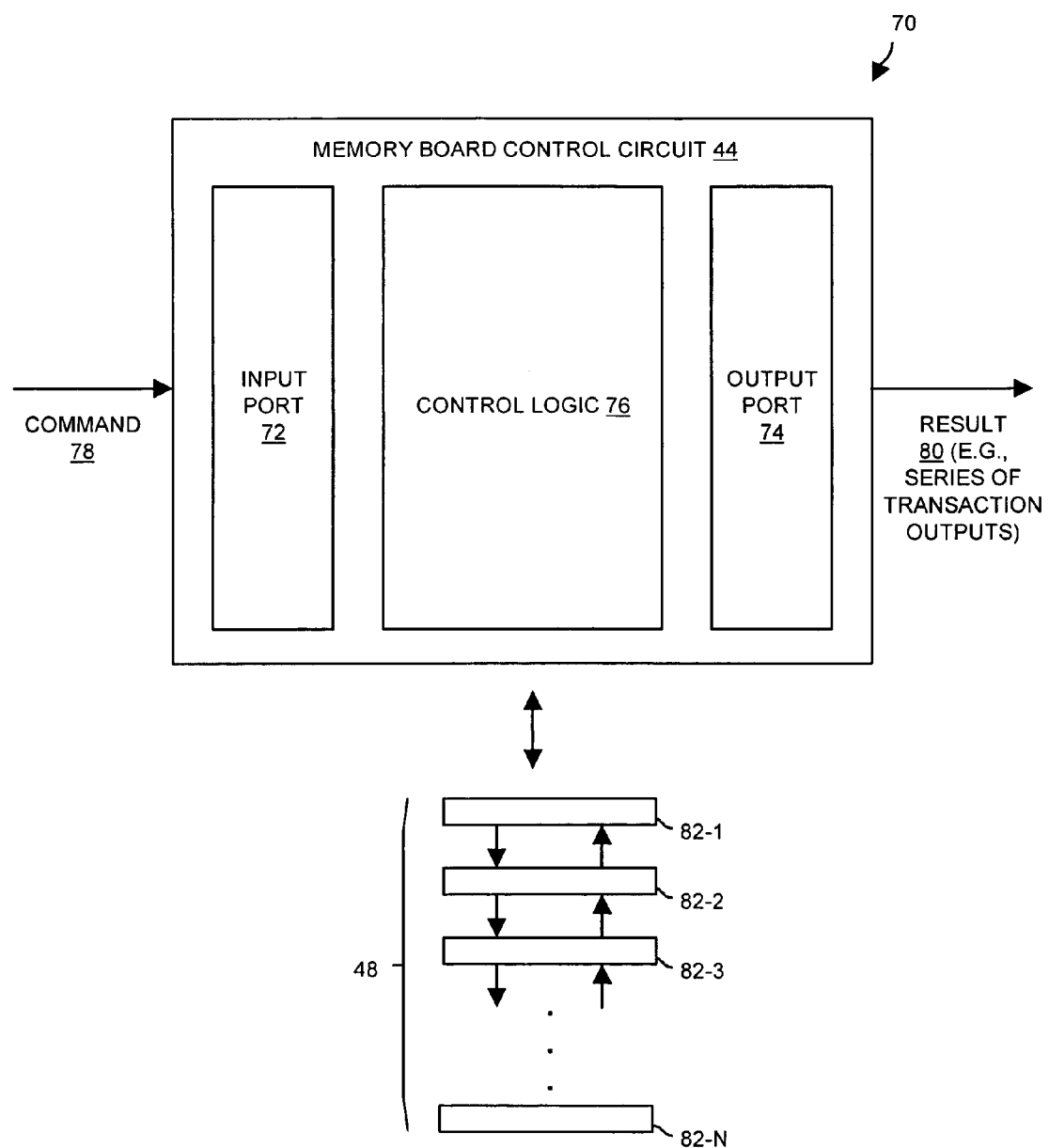
FIG. 3 is a block diagram of a memory board control circuit of the memory board of FIG. 2 which is capable of accessing a doubly linked list shared data structure in an atomic manner.

FIG. 3 shows a block diagram 70 of a memory board control circuit 44 of the memory board 38 of FIG. 2. The memory board control circuit 44 includes an input port 72, and output port 74, and control logic 76 interconnected between the input port 72 and the output port 74. The control logic 76 is configured to modify the data structure 48 in an atomic manner in response to a single command 78 received from a processor board 36, 40 through the set of buses 32 and the input port 72. The control logic 76 is further configured to provide a result 80 back to that processor board 36, 40 through the output port 74 and the set of buses 32.

As shown in FIG. 3, the data structure 48 includes a series of entries 82-1, 82-2, . . . 82-N (collectively, entries 82) which are arranged as a doubly linked list. The control logic 76 of the memory board control circuit 44 is capable of a modifying the series of entries 82 in an atomic manner. For example, the control logic 76 is capable of atomically removing an entry 82 in response to a remove command, atomically adding an entry 82 in response to an add command, and atomically moving an entry 82 in response to a move command. Preferably, the control logic 76 is capable of performing other operations on the data structure 48 as well (e.g., atomically reading, modifying and storing a header pointer of the data structure 48). Further details of the invention will now be provided with reference to FIG. 4.

Figure 4:
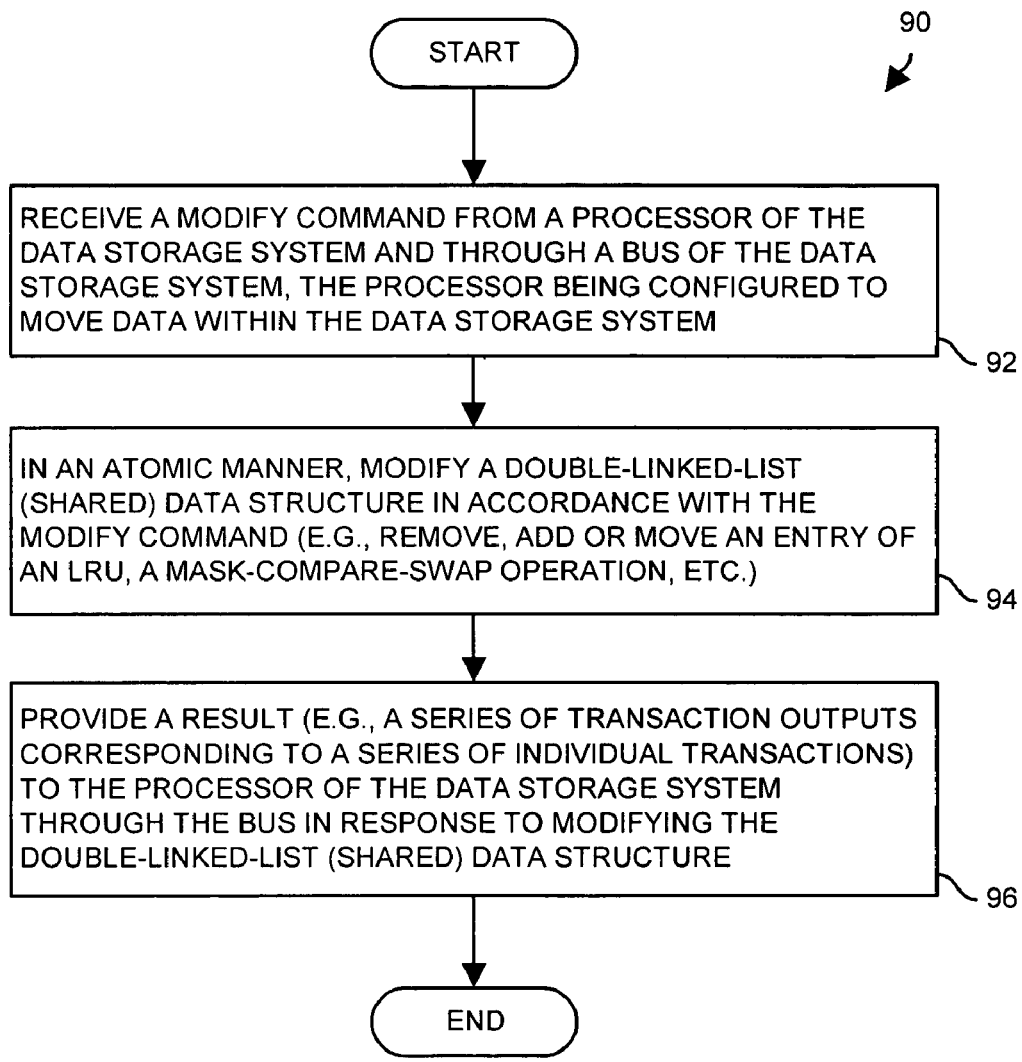
FIG. 4 is a procedure which is performed by the memory board of FIG. 2 in order to atomically access the doubly linked list shared data structure of FIG. 3.

FIG. 4 shows a procedure 90 which is performed by the control logic 76 of the memory board control circuit 44 of FIG. 3 in order to access the doubly linked list shared data structure 48 in an atomic manner. In step 92, the memory board 38 receives a modify command 78 (also see FIG. 3) from one of the processor boards 36, 40 through a bus 32 of the data storage system 22 (see FIG. 1). As mentioned above, any of the processor boards 36, 40 are capable of providing the modify command (e.g., a processor board 36 of the front-end circuitry 26 when reading data from the I/O cache on behalf of a host 24, a processor board 40 of the back-end circuitry 30 when loading data from a storage device 34, etc.).

In step 94, the control logic 76 of the memory board control circuit 44 modifies the data structure 48 in an atomic manner in accordance with the modify command. For example, the control logic 76 atomically removes an entry 82 in response to a remove command, atomically adds an entry 82 in response to an add command, and atomically moves an entry 82 in response to a move command. As just described, modification of the doubly linked list shared data structure 48 occurs through a single communication between the processor and the memory board (i.e., the modify command), rather than through multiple communications as with the earlier-described conventional approach to accessing an LRU queue. Accordingly, there is less bus contention (i.e., less arbitrations and uses of the set of buses 32), and no locking mechanism required to modify the data structure. As such, there is faster response time in carrying out the modify command.

In step 96, the memory board 38 provides a result 80 (also see FIG. 3) back to the processor board 36, 40 of the data storage system 22 through the bus 32 in response to modifying the data structure 48. In one arrangement, the result 80 includes a series of transaction outputs corresponding to a series of individual transactions performed by the control logic 76 of the memory board control circuit 44 in response to the modify command. In another arrangement, the result 80 includes a single communication back to the processor board 36, 40 (e.g., indicating success or failure of the modify operation). Further details of the invention will now be provided with reference to the following example which makes reference to FIGS. 5–7.

The following example illustrates the operation of a memory board 38 when carrying out modification of a doubly linked list shared data structure 48 in an atomic manner. By way of example only, suppose that the data storage system 22 is configured to use a shared Least-Recently-Used (LRU) queue which is arranged as a doubly linked list shared data structure such as the data structure 48 of FIGS. 1 and 3. Furthermore, suppose that a memory board 38, which operates in accordance with the procedure 110 illustrated in FIG. 4, stores the LRU queue. As such, the memory board 38 is configured to update the LRU queue in an atomic manner (i.e., in response to a single communication) thus minimizing contention for the set of buses 32, and alleviating the need for a locking mechanism to avoid access conflicts. Accordingly, modification of the LRU queue occurs with a relatively fast response time (i.e., minimal latency due to bus contention), and without requiring overhead for coordinating access to a shared data structure.

Figure 5:
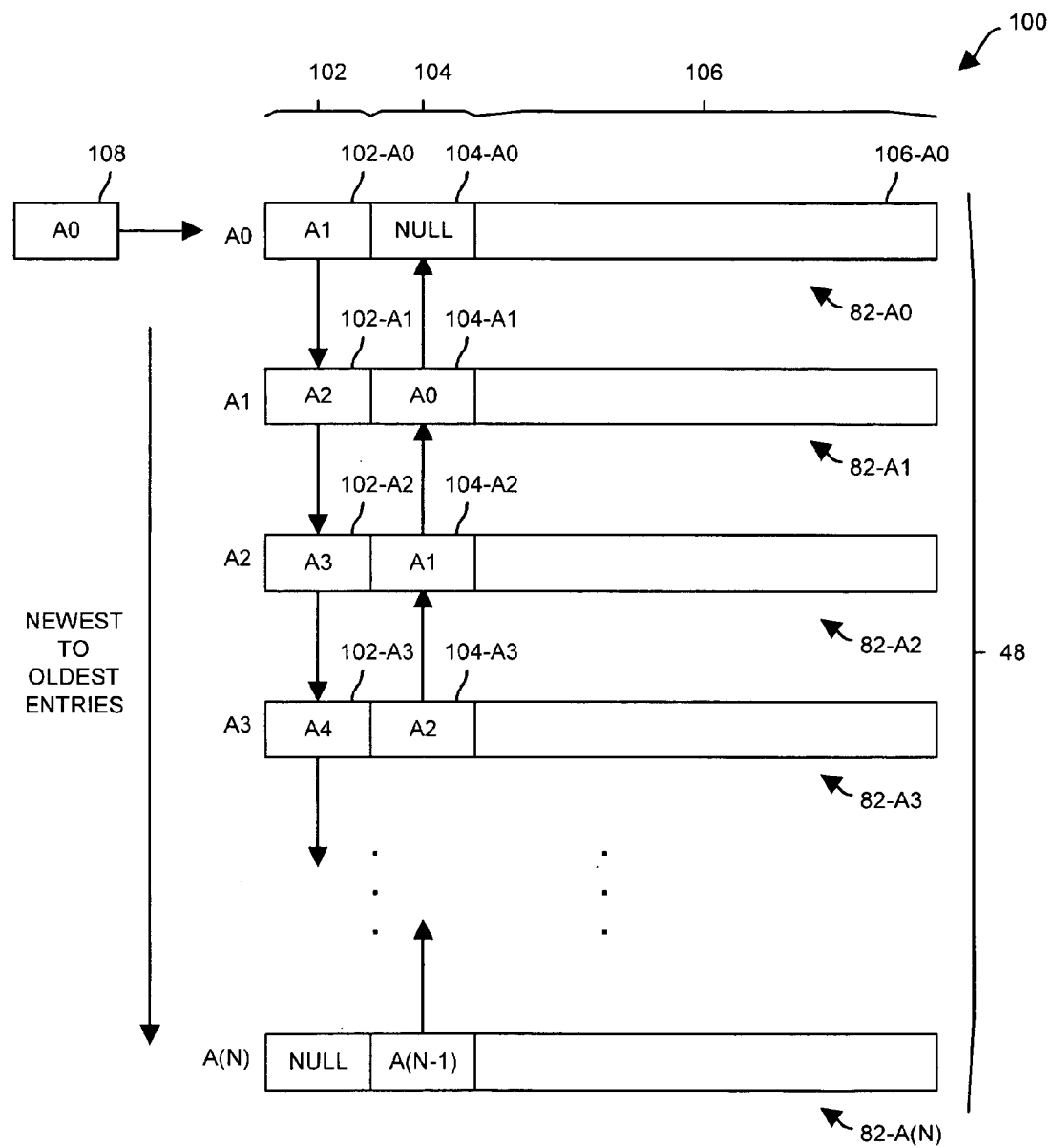
FIG. 5 is an example of a doubly linked list shared data structure which is accessible by the memory board of FIG. 2.

FIG. 5 shows a block diagram of an LRU queue 100 which is suitable for use by the data storage system 22 of FIG. 1. LRU queue 100 includes a series of LRU entries 82-A0, . . . , 82-A(N) (collectively, entries 82). Each LRU entry 82 includes a forward pointer 102, a reverse pointer 104, and a body 106. LRU queue 100 further includes a head pointer 108 that identifies the beginning LRU entry 82-A0 of the series of LRU entries 82. In particular, the head pointer 108 stores an address "A0" which identifies the LRU entry 82-A0 as the first LRU entry 82 in the LRU queue 100. It should be understood that the LRU entries 82 are shown, by way of example only, as having addresses A0, A1, . . . , A(N), and organized logically. Physically, the LRU entries 82 can be scattered (perhaps in a different order) within a dedicated area of the system memory.

The body 106 of each LRU entry 82 identifies (perhaps among other things) a memory region (e.g., a block) of the data storage system's I/O cache. The order of the series of entries 82 indicates which memory regions of the I/O cache are the more recently used. In particular, the memory region identified by the first LRU entry 82-A0 is the most recently used, the memory region identified by the second LRU entry 82-A1 is the next most recently used, and so on. The memory region identified by the last LRU entry 82-A(N) is the least recently used.

Recall that the LRU queue 100 is a doubly linked list. Accordingly, the forward pointer 102 of each LRU entry 82 identifies an adjacent succeeding entry 82. For example, the forward pointer 102-A0 stores an address "A1" which identifies the LRU entry 82-A1, the forward pointer 102-A1 stores an address "A2" which identifies the LRU entry 82-A2, and so on. The operations for storing the information (e.g., the addresses) in the LRU entries 82 can be implemented as a mask-compare-and-swap operations. Alternatively, the store operations can be implemented as simple write operations.

Similarly, the reverse pointer 104 of each LRU entry 82 identifies an adjacent succeeding LRU entry 82. For example, the reverse pointer 102-A3 stores an address "A2" which identifies the LRU entry 82-A2, the forward pointer 102-A2 stores an address "A1" which identifies the LRU entry 82-A1, and so on.

By way of example only, suppose that one of the processor boards 36, 40 accesses data stored in an I/O cache memory region which is identified by the third entry 82-A2 of the LRU queue 100 (i.e., the LRU entry 82 at address "A2"). Additionally, suppose that the processor board 36, 40 provides a move command 78 to the memory board 38 which stores the LRU queue 100 of FIG. 5 in order to move (i.e., promote) the LRU entry 82-A2 to the beginning of the LRU queue 100. In order to provide the move command 78, the processor board 36, 40 arbitrates for one of the set of buses 32 and, when granted access, provides the move command 78 to the memory board 39 through that bus 32. A suitable instruction/command syntax for the move command 78 is

LIST_MOVE_TO_HEAD(*LIST,
 *ENTRY_TO_MOVE)

where *LIST is a pointer that identifies the doubly linked list data structure, and *ENTRY_TO_MOVE is a pointer that identifies the particular entry within the data structure to be moved to the beginning of the data structure. Accordingly, the move command 78 could be expressly programmed to move the LRU entry 82-A2 to the beginning of the LRU queue 100 of FIG. 5 using the following coded instruction:

LIST_MOVE_TO_HEAD(*LRU_QUEUE,"A2")

where *LRU_QUEUE identifies the LRU queue 100, and "A2" is the address of the LRU entry 82-A2 to be moved to the beginning of the list. Other instruction/command syntaxes are suitable for use as well such as syntaxes that provide for various forms of indirect addressing (e.g., pointers to other pointers).

In response to the move command 78, the control logic 76 of the memory board 38 performs a series of transactions to move the LRU entry 82-A2 to the beginning of the LRU queue 100. First, control logic 76 identifies the adjacent preceding LRU entry 82-A1 and the adjacent succeeding LRU entry 82-A3 by reading the forward and reverse pointers 102-A2, 104-A2 of the LRU entry 82-A2 to be moved.

Figure 6:
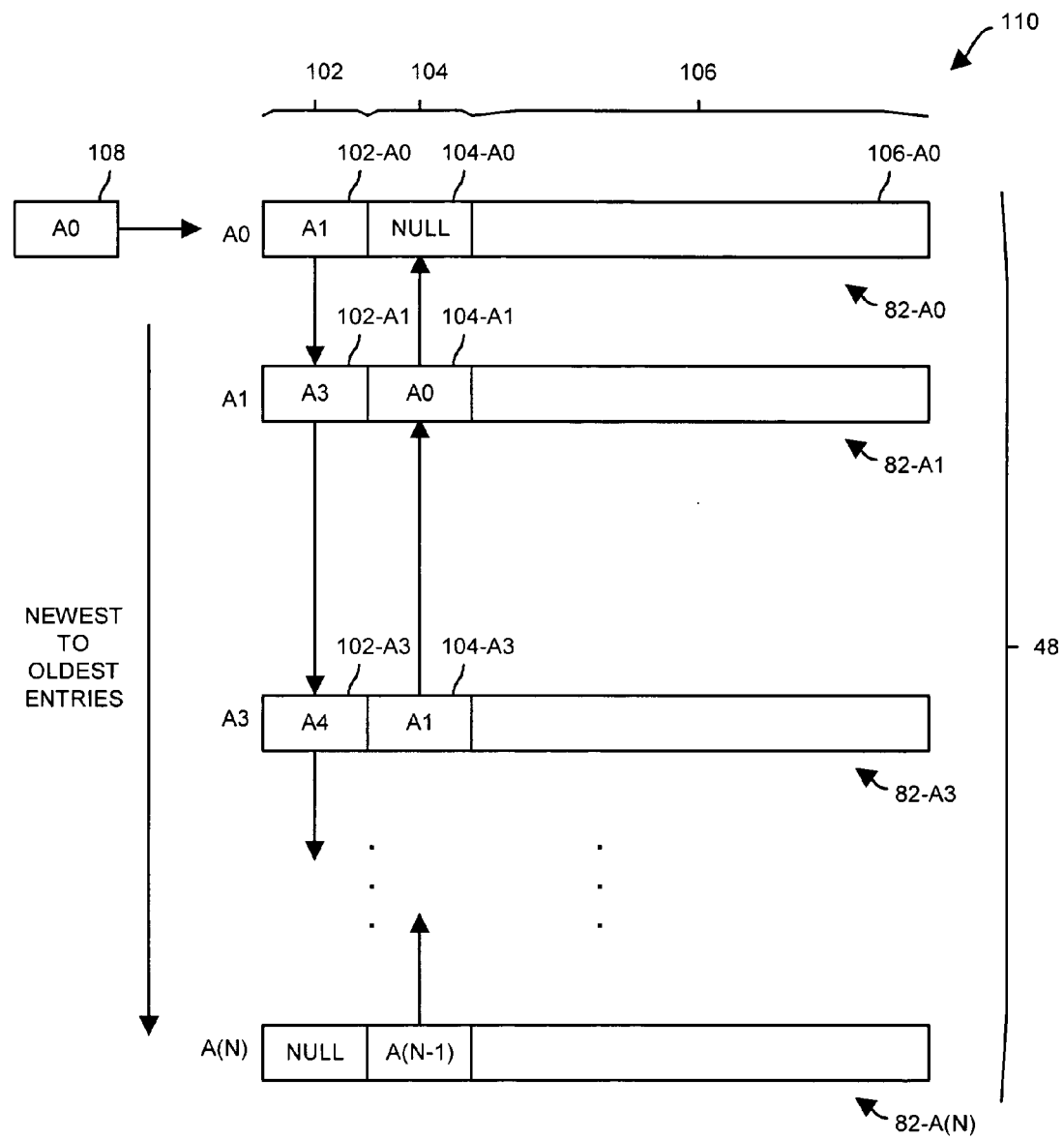
FIG. 6 is the doubly linked list shared data structure of FIG. 5 after the memory board has removed an entry.

Second, the control logic 76 removes the LRU entry 82-A2 from the series of entries 82. In particular, the control logic 76 reads, modifies and stores the forward pointer 102-A1 of the adjacent preceding LRU entry 82-A1 so that the forward pointer 102-A1 no longer points to the LRU entry 82-A2, but now points to the LRU entry 82-A3 (i.e., stores address "A3" in the forward pointer 102-A1). Similarly, the control logic 76 reads, modifies and stores the reverse pointer 104-A3 of the adjacent succeeding LRU entry 82-A3 so that the reverse pointer 104-A3 no longer points to the LRU entry 82-A2, but now points to the LRU entry 82-A1 (i.e., stores address "A1" in the reverse pointer 104-A3). At this point, and as shown in FIG. 6, the LRU entry 82-A2 is removed from the LRU queue 100.

Now, the control logic 76 identifies the LRU entry 82-A2 at the beginning of the LRU queue 100. To this end, the control logic 76 finds the first LRU entry 82-A0 in the LRU queue 100 by reading the head pointer 108 of the LRU queue 100.

Next, the control logic 76 adds the LRU entry 82-A2 to the beginning of the LRU queue 100. In particular, the control logic 76 reads, modifies and stores the reverse pointer 104-A0 of the LRU entry 82-A0, i.e., stores the address "A2" in the reverse pointer 104-A0. Then, the control logic 76 modifies and stores the forward and reverse pointers 102-A2, 104-A2 of the LRU entry 82-A2. In one arrangement, the control logic 76 sets the reverse pointer 104-A2 to NULL thus indicating that it is the beginning of the LRU queue 100. In another arrangement, the control logic 76 sets the reverse pointer 104-A2 to "A2" so that it points to itself, i.e., so that it identifies the LRU entry 82-A2. Additionally, the control logic 76 modifies the head pointer 108 by storing "A2" in the head pointer 108 thus indicating that the LRU entry 82-A2 is now at the beginning of the LRU queue 100.

Figure 7:
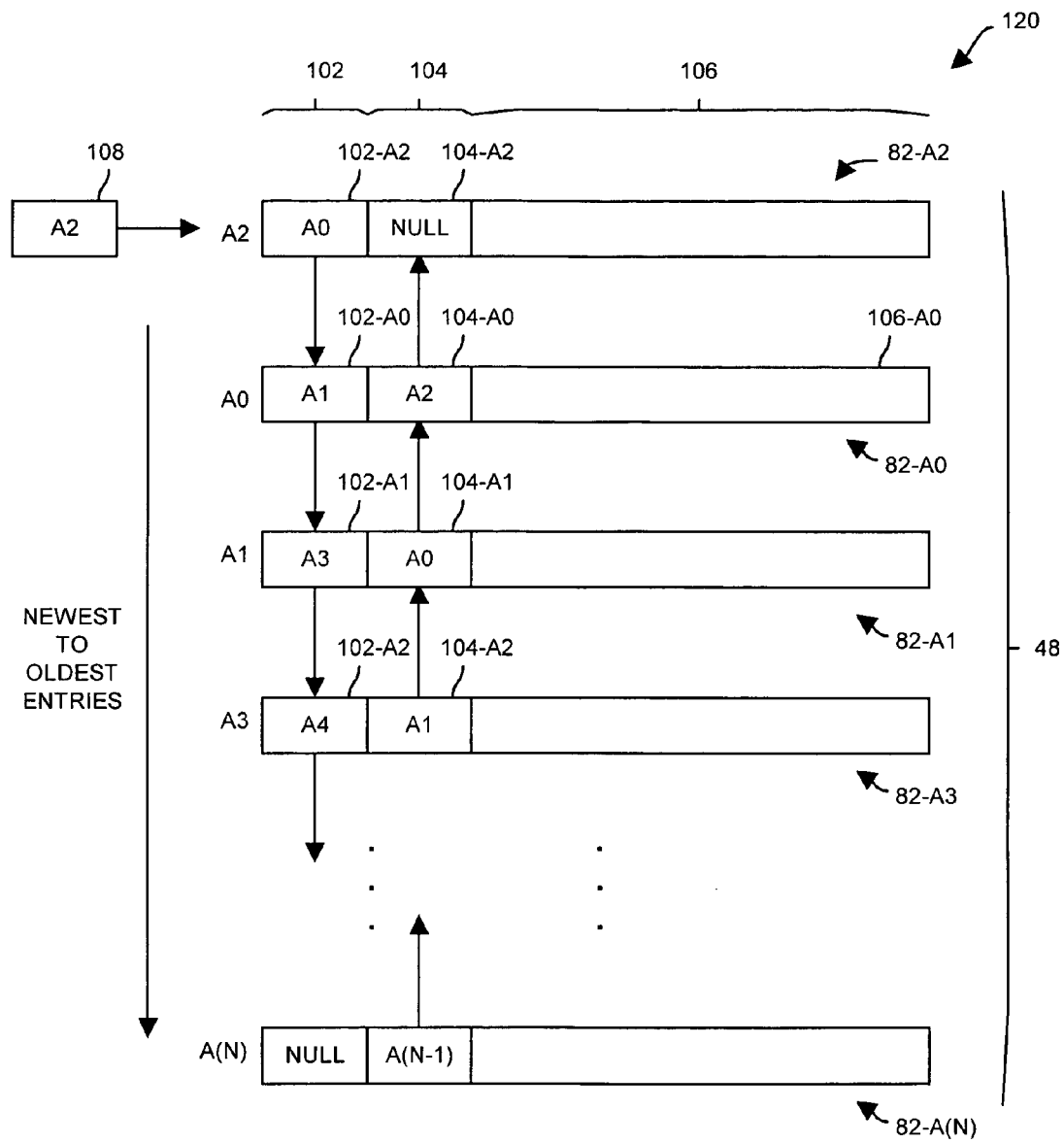
FIG. 7 is the doubly linked list shared data structure of FIG. 6 after the memory board has added the removed entry to the beginning of the doubly linked list.

FIG. 7 shows the LRU queue 100 after the LRU entry 82-A2 has been moved to the beginning of the LRU queue 100. As such, the memory region of the I/O cache identified by the LRU entry 82-A2 is now identified as the most recently used memory region of the I/O cache. Since the movement of the entry 82-A2 takes place atomically within the memory board 38 in response to a single communication from the processor board 36, 40, bus contention is minimized and there is no need for locking of the LRU queue 100.

It should be understood that the control logic 76 provides the processor board 36, 40 with a result 80 in response to the move command 78 from the processor board 36, 40. The result 80 passes through the output port 74 of the memory board control circuit 44 (see FIG. 3), the interface 42 of the memory board 38 (see FIG. 2), and the set of buses 32 (see FIG. 1). In one arrangement, the result 80 from the memory board 38 is a single communication that includes an indication of success or failure (e.g., a bit pattern) based on the outcome of the move operation. The processor board 36, 40 can analyze this result to determine its next course of operation (e.g., perform a new data access operation if successful, resend the move command 78 upon failure, perform an error handling procedure upon failure, etc.). In another arrangement, and as will now be further explained with reference to FIG. 8, the result 80 includes a series of transaction outputs resulting from a series of incremental tasks performed by the memory board 38, and the processor boards 36, 40 are configured to monitor (e.g., error check) the series of transaction outputs prior to continuing further (e.g., prior to sending another command 78).

Figure 8:
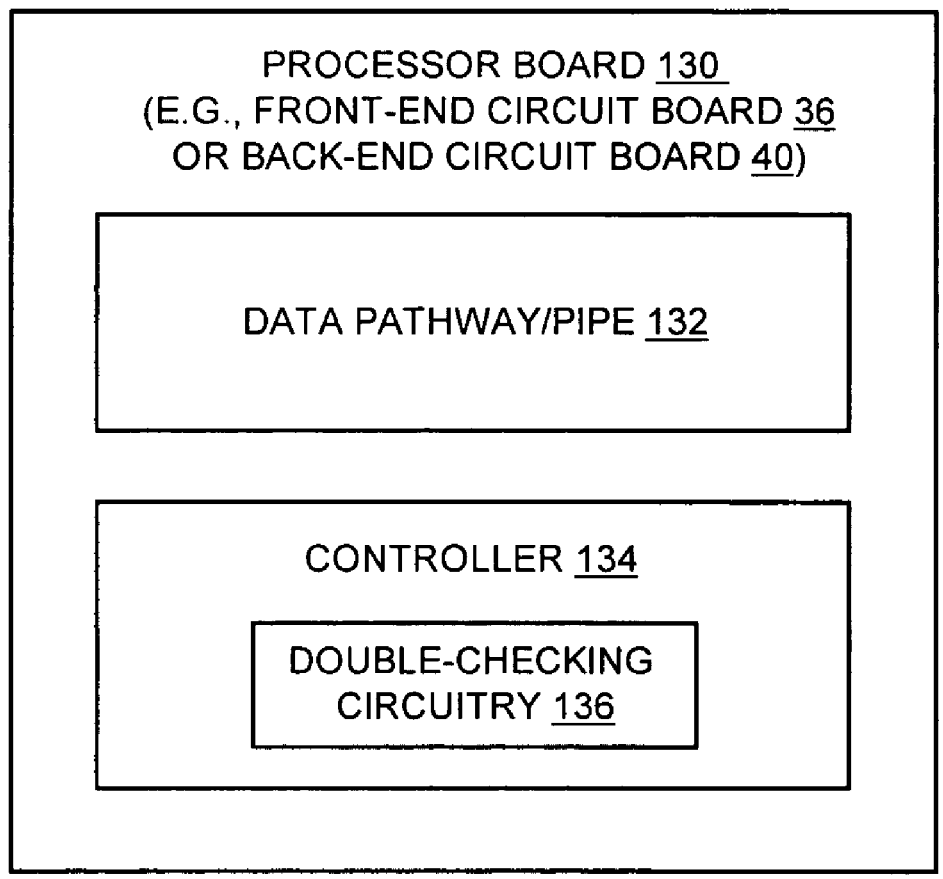
FIG. 8 is a block diagram of a processor board which is suitable for use as at least part of front-end circuitry and/or back-end circuitry of the data storage system of FIG. 1.

FIG. 8 is a block diagram of a processor board 130 which is suitable for use as one or more of the processor boards 36 of the front-end circuitry 26, and/or one or more of the processor boards 40 of the back-end circuitry 30. The processor board 130 includes a data pathway 132 (e.g., a "data pipe") and a controller 134 (e.g., a processor) that oversees the operation of the data pathway 132. The controller 134 includes double-checking circuitry 136 which is configured to monitor incremental transactions performed by a memory board 38 when the processor board 130 sends a command 78 (e.g., a move command to atomically move an entry within a doubly linked list, a remove command to remove an entry, an add command to add an entry, etc.) to the memory board 38.

Figure 9:
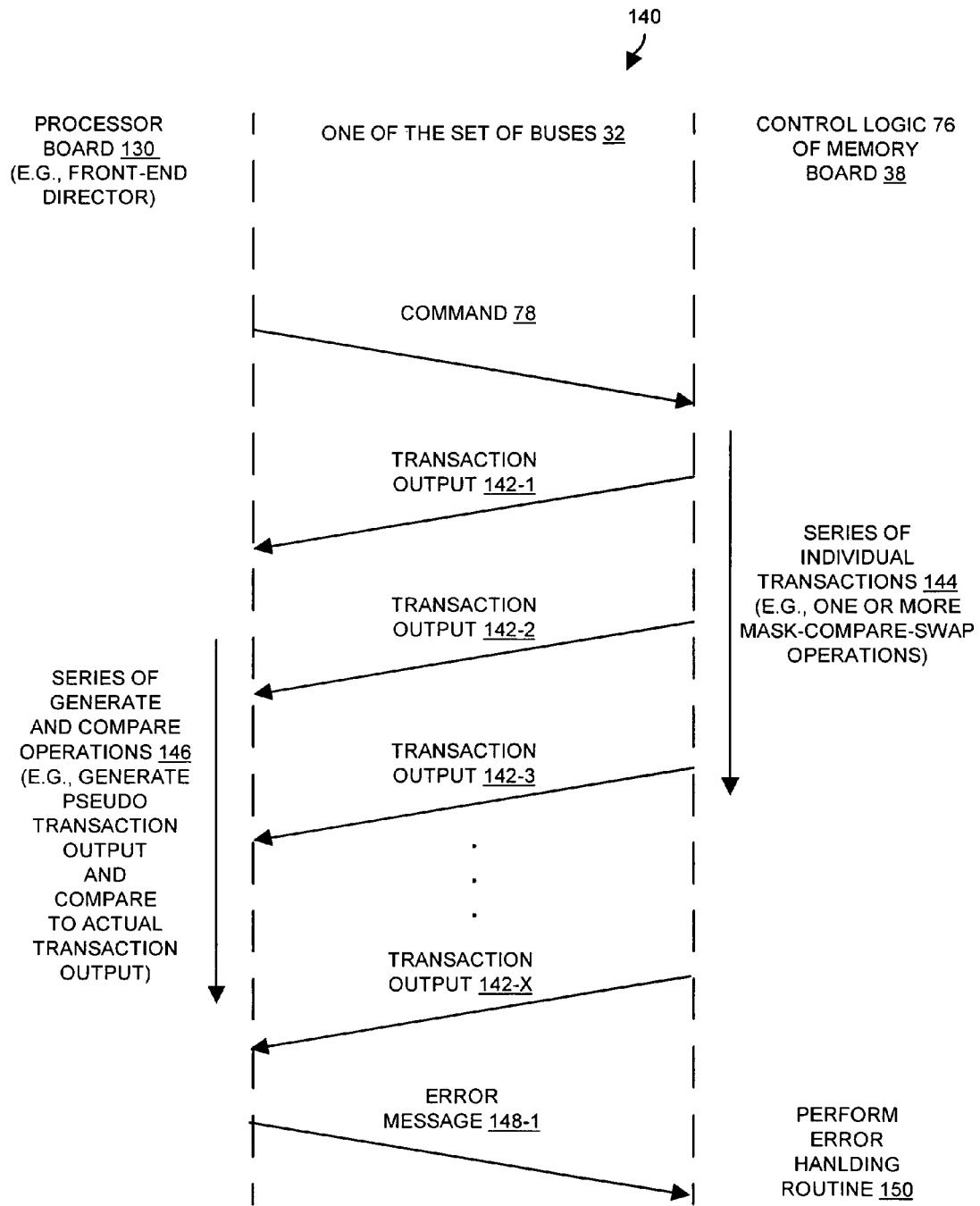
FIG. 9 is a diagram of signals which can be passed between the processor board of FIG. 8 and the memory board of FIG. 2 when handling an error detected by the processor board.

FIG. 9 shows a diagram 140 illustrating how the memory board 38 passes a series of transaction outputs 142-1, ..., 142-X (collectively, transaction outputs 142) back to the processor board 130 in response to a command 78 (e.g., the earlier-described move command 78). Preferably, the series of transaction outputs 142 is a complete accounting of the modify operation (e.g., including data read, branches taken, data written, etc.). The passing of time is represented in FIG. 9 in the downward direction. The operation of the control logic 76 of the memory board 38 can be viewed as a series of individual transactions 144 which is performed over time. As the control logic 76 completes each transaction 144, the control logic provides a transaction output 142 (e.g., transaction output 142-1) back to the processor board 130. For example, suppose that the processor board 130 provided the move command 78 in the earlier-provided example which referenced FIGS. 5–7. In response, the memory board 38 returns, as the result 80, a series of transaction outputs indicating incremental outcomes of the series of tasks performed by the control logic on the LRU queue 100 of FIGS. 5–7. Such a series of transaction outputs is similar to what a CPU board of a conventional data storage system would receive from a standard memory board when providing multiple communications to the memory board though the interconnect to move an LRU entry to the beginning of an LRU queue. In particular, in the earlier-described example, when the control logic 76 initially reads the forward and reverse pointers 102-A2, 104-A2 of the LRU entry 82-A2 (see FIG. 5) to determine the adjacent preceding LRU entry 82-A1 and the adjacent succeeding LRU entry 82-A3, the control logic can send the results of the read to the processor board 36, 40 (i.e., the contents of the LRU entry 82-A2).

Additionally, when the control logic 76 of the memory board 38 removes the LRU entry 82-A2 from the series of LRU entries 82, the control logic 76 can send the results to the processor board 36, 40. That is, when the control logic 76 reads, modifies and stores the forward pointer 102-A1 of the adjacent preceding entry 82-A1 (so that the forward pointer 102-A1 no longer points to the entry 82-A2, but now points to the entry 82-A3), the control logic 76 can pass the read forward pointer 102-A1 and the newly written forward pointer 102-A1 to the processor board 36, 40. Furthermore, when the control logic 76 reads, modifies and stores the reverse pointer 104-A3 of the adjacent succeeding entry 82-A3 (so that the reverse pointer 104-A3 no longer points to the entry 82-A2, but now points to the entry 82-A1), the control logic 76 can pass the read reverse pointer 104-A3 and the newly written reverse pointer 104-A3 to the processor board 36, 40, and so on.

It should be understood that the memory board 38 can provide a thorough accounting of its operation. For example, when removing the LRU entry 82-A2, the results 80 from the memory board 38 preferably include the data read from the entry 82-A2, the data written to the entry 82-A2, and any intermediate information generated or used by the memory board 38.

Since the series of transaction outputs 142 is an accounting of the modify operation performed by the memory board 38, the processor board 130 has the opportunity to mimic the modify operation and verify the actual results. That is, as the processor board 130 receives the series of transaction outputs 142 from the memory board 38, the double-checking circuitry 136 double checks the operation of the memory board 38 by performing a series of generate and compare operations 146. That is, the processor board 130 generates a series of pseudo transaction outputs based on information within the series of transaction outputs 142, and then compares the pseudo transaction outputs to actual ones (i.e., from the series of transaction outputs 142).

For example, as the processor board 130 receives the transaction outputs 142 from the memory board 38 in response to the move command 78, the double-checking circuitry 136 can mimic the operation of the memory board 38 (i.e., as if the processor board 130 were performing the operation by providing a series of communications in a conventional manner rather than by providing an atomic move command) and compare its anticipated results (i.e., pseudo transaction outputs) with the transaction outputs 142. If the results agree, the processor board 130 concludes that the operation occurred properly. However, if the results do not agree, the processor board 130 concludes that a error arose and initiates an error handling procedure (e.g., a retry, a recovery operation, etc.). For example, as shown in FIG. 9, the processor board 130 can send an error message 148 to the memory board 38 directing the memory board 38 to perform an error handling routine 150. In response, the memory board 38 performs that error handling routine 150.

It should be understood that the operation of the double-checking circuitry 136 complements (i.e., is a fall-back to) error checking circuitry within memory board 38 itself. If the error checking circuitry of the memory board 38 detects an error, the memory board 38 can carryout an error handling routine to correct the error as well (e.g., ask the processor board 130 to resend the move command 78, attempt to recover the data, etc.), or to report the error to the processor board 130 and abort. The operation of the double-checking circuitry 136 of the processor board 130 in conjunction with the error checking circuitry of the memory board 38 provides superior fault tolerance to simply performing error checking within the memory board 38 itself, or within the processor board 130 itself. In particular, if the error checking circuitry within the memory board 38 failed to detect an error, the double-checking circuitry 136 of the processor board 130 has an opportunity to step in and initiate handling of the error.

It should be further understood that the memory board 38 of the data storage system 22 was described above as performing an atomic move operation on an LRU queue 100 in response to a move command 78 from a processor board 36, 40, 130 by way of example only. A similar command can be performed atomically on data structures other than the LRU queue 100 (e.g., on other doubly linked lists) which shared or even unshared. Furthermore, there is no requirement that the doubly linked list be part of the operating system. Rather, the doubly linked list can be a data structure which is manipulated by an application other than the operating system running on one of the processor boards 36, 40.

Additionally, it should be understood that commands other than move commands can be atomically performed by the memory board 38. For example, the memory board 38 can atomically perform a remove command 78 to remove an entry from a doubly linked list (e.g., see FIGS. 5 and 6). As another example, the memory board 38 can atomically perform an add command 78 to add an entry to a doubly linked list (e.g., see FIGS. 6 and 7). As yet another example, the memory board 38 can atomically perform a move command 78 that moves an entry to the end of the doubly linked list rather than the beginning.

The following is a list of various commands 78 (among others) that can be performed by the memory board 38 in an atomic manner: LIST_INIT( ) to initialize a doubly linked list structure (e.g., an initially empty data structure), LIST_ADD( ) to insert an entry to the doubly linked list at a particular point, LIST_ADD_TO_HEAD( ) to insert an entry to the doubly linked list at the head, LIST_ADD_TO_TAIL( ) to insert an entry to the doubly linked list at the tail, LIST_REMOVE( ) to remove an entry from the doubly linked list, LIST_REMOVE_HEAD to remove the first entry from the doubly linked list and make the next entry the head, LIST_REMOVE_TAIL to remove the last entry from the doubly linked list and make the next prior entry the tail, LIST_READ( ) to extract portions of the doubly linked list in order, LIST_MOVE_TO_HEAD( ) to promote an entry to the head, LIST_MOVE_TO_TAIL( ) to demote an entry to the tail, LIST_VERIFY( ) to error check the doubly linked list (e.g., to ensure that the doubly linked list is contiguous and non-looping by traversing the entire doubly linked list, to return any removed entries, etc.), LIST_LOOKUP( ) to find an entry in the doubly linked list and report its position and data, and LIST_UPDATE( ) to change slot pointers within the doubly linked list and search keys. The use of such commands 78 to carry out atomic operations alleviates (i) the need for excessive communications between the processor 36, 40 and the memory board 38 through the set of buses 32, and (ii) the need for locking the data structure.

In some arrangements, one or more of the above-described commands 78 is carried out by programming the memory board 38 using a SCRIPT command. In these arrangements, the processor board 130 provides a communication to the memory board 38. The communication includes a SCRIPT command and a payload containing a series of individual instructions (rather than, or in combination with data). The memory board 38 then performs a series of operations (e.g., operations that access the LRU) based on the series of individual instructions. Similar tasks are described in a copending U.S. Patent Application filed on even date herewith Ser. No. 09/972284 and entitled "A DATA STORAGE SYSTEM HAVING AN IMPROVED MEMORY CIRCUIT BOARD," by the same inventor as in the present application and assigned to the same assignee as the present application, the teachings of which are hereby incorporated by reference in their entirety.

Furthermore, in some arrangements, other commands similar to the various earlier-described commands 78 can be performed by the memory board 38 in a manner similar to that described above. For example, in some arrangements, the processor board 130 can also direct the memory board 38 to access a shared set of hash lists in order to track which data elements stored in the set of disk drives 34 are also stored in the volatile memory 28 (e.g., cache). Similar tasks are described in a copending U.S. Patent Application filed on even date herewith Ser. No. 09/972314 and entitled "METHODS AND APPARATUS FOR ACCESSING DATA ELEMENTS USING IMPROVED HASHING TECHNIQUES," by the same inventor as in the present application and assigned to the same assignee as the present application, the teachings of which are hereby incorporated by reference in their entirety.

As described above, embodiments of the invention are directed to techniques for accessing a doubly linked list shared data structure 48 (e.g., the LRU queue 100) in a memory board 38 of a data storage system 22 by modifying the data structure 48 in an atomic manner (e.g., by performing a series of tasks or transactions on the LRU queue 100 in response to a single command 78). Such operation can occur in response to a single communication between a processor board 36, 40, 130 and the memory board 38 through a set of buses 32 (e.g., a backplane interconnect) thus reducing bus contention (e.g., with fewer communications through the set of buses 32), lowering delays (e.g., with fewer bus arbitrations), and requiring less shared resource management overhead, vis-á-vis conventional approaches to accessing an LRU queue using many communications. Accordingly, these embodiments of the invention provide faster response times and use less processor time, thus permitting more data access operations to be performed per second. The features of the invention, as described above, may be employed in computer systems, circuit boards and methods as well as other computer-related devices such as those of EMC Corporation of Hopkinton, Mass.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the memory board 38 and processor boards 36, 40, 130 were described above as operating in a data storage system 22 by way of example only. The memory board 38 and processor boards 36, 40, 130 are suitable for use in other types of equipment as well such as in a general purpose computer, a specialized computer (e.g., a specially configured device that performs a real-time computing function), network attached storage (NAS) devices, storage area network (SAN) devices, etc.

Additionally, it should be understood that the doubly linked list data structure 48 was described above as a shared data structure by way of example only, i.e., accessible by any of the processor boards 36, 40 of the front-end circuitry 26 and the back-end circuitry 30. The doubly linked list data structure 48 need not be shared. Rather, it can be exclusively accessibly by a particular processor board 36, 40 (e.g., by a single application running on one of the processor boards 36, 40). In this situation, the atomic operation of the memory board 38 still minimizes bus contention thus improving overall response times.

Furthermore, it should be understood that the data storage system 22 was described above as including multiple front-end processor boards 36, multiple memory board 38 and multiple back-end processor boards 40 by way of example only. Other configurations are suitable for the data storage system 22 as well such as having only a single front-end processor board 36, a single memory board 38 and/or a single back-end processor board 40.

Additionally, it should be understood that the memory board 38 can be configured to perform various optimizations. For example, when modifying the LRU queue 100 (see FIGS. 5–7), the memory board 38 can be configured to filter modify commands 78 from the processor boards 36, 40, 130 and combine LRU operations (e.g., move multiple LRU entries simultaneously), not perform certain LRU operations (e.g., refuse to move an LRU entry when movement of that entry does not necessarily improve performance), etc.

Furthermore, it should be understood that it is not required that the processor boards 36, 40 be configured to double check the operation of the memory board 38. Such double checking improves fault tolerance of the data storage system 22. However, such double checking also somewhat increases traffic through the set of buses 32. The use of such double checking by the processor boards 36, 40 preferably is selectable (e.g., turned on or off by setting a control register, etc.).

What is claimed is:

1. A memory board for a data storage system, comprising:
   an interface which is configured to couple to a bus of the data storage system;
   memory which is configured to store a doubly linked list data structure; and
   a memory board control circuit, coupled to the interface and the memory, the memory board control circuit being configured to:
   receive a modify command from a processor of a data storage system through the interface, the processor being configured to move data within the data storage system,
   atomically modify the doubly linked list data structure in accordance with the modify command, and
   provide a result to the processor of the data storage system through the interface in response to modifying the doubly linked list data structure.

2. The memory board of claim 1 wherein the doubly linked list data structure is a doubly linked list shared data structure.

3. The memory board of claim 2 wherein the doubly linked list shared data structure includes multiple entries, wherein the modify command is a remove instruction, and wherein the memory board control circuit is configured to atomically modify the doubly linked list shared data structure by removing an entry from the doubly linked list shared data structure in response to the remove instruction.

4. The memory board of claim 2 wherein the doubly linked list shared data structure includes multiple entries, wherein the modify command is an add instruction, and wherein the memory board control circuit is configured to atomically modify the doubly linked list shared data structure by adding an entry to the doubly linked list shared data structure in response to the add instruction.

5. The memory board of claim 2 wherein the doubly linked list shared data structure includes multiple entries, wherein the modify command is a move instruction, and wherein the memory board control circuit is configured to atomically modify the doubly linked list shared data structure by moving an entry from a first position in the doubly linked list shared data structure to a second position in the doubly linked list shared data structure in response to the move instruction.

6. The memory board of claim 2 wherein the memory board control circuit is configured to atomically modify the doubly linked list shared data structure by performing a series of individual transactions on the doubly linked list shared data structure, and wherein the memory board control circuit is configured to provide, as the result, a series of transaction outputs respectively corresponding to the series of individual transactions.

7. A data storage system, comprising:
a set of storage devices;
a processor which is configured to move data to and from the set of storage devices;
a bus coupled to the processor; and
a memory board that includes (i) an interface which couples to the bus, (ii) memory which is configured to store a doubly linked list data structure, and (iii) a memory board control circuit, coupled to the interface and the memory, the memory board control circuit being configured to:
receive a modify command from the processor of the data storage system through the interface and the bus,
atomically modify the doubly linked list data structure in accordance with the modify command, and
provide a result to the processor of the data storage system through the interface and the bus in response to modifying the doubly linked list data structure.

8. The data storage system of claim 7 wherein the doubly linked list data structure is a doubly linked list shared data structure.

9. The data storage system of claim 8 wherein the doubly linked list shared data structure includes multiple entries, wherein the modify command is a remove instruction, and wherein the memory board control circuit is configured to atomically modify the doubly linked list shared data structure by removing an entry from the doubly linked list shared data structure in response to the remove instruction.

10. The data storage system of claim 8 wherein the doubly linked list shared data structure includes multiple entries, wherein the modify command is an add instruction, and wherein the memory board control circuit is configured to atomically modify the doubly linked list shared data structure by adding an entry to the doubly linked list shared data structure in response to the add instruction.

11. The data storage system of claim 8 wherein the doubly linked list shared data structure includes multiple entries, wherein the modify command is a move instruction, and wherein the memory board control circuit is configured to atomically modify the doubly linked list shared data structure by moving an entry from a first position in the doubly linked list shared data structure to a second position in the doubly linked list shared data structure in response to the move instruction.

12. The data storage system of claim 8 wherein the memory board control circuit is configured to atomically modify the doubly linked list shared data structure by performing a series of individual transactions on the doubly linked list shared data structure, and wherein the memory board control circuit is further configured to provide, as the result, a series of transaction outputs respectively corresponding to the series of individual transactions.

13. The data storage system of claim 12 wherein the series of transaction outputs provided by the memory board control circuit includes a first transaction output and a second transaction output; wherein the processor is configured to (i) generate a pseudo transaction output based on the first transaction output and (ii) compare the pseudo transaction output to the second transaction output in order to error check operation of the memory board.

14. In a memory board of a data storage system, a method for accessing a doubly linked list data structure, the method comprising the steps of:
receiving a modify command from a processor of a data storage system through a bus of the data storage system, the processor being configured to move data within the data storage system,
atomically modifying the doubly linked list data structure in accordance with the modify command, and
providing a result to the processor of the data storage system through the bus in response to modifying the doubly linked list data structure.

15. The method of claim 14 wherein the step of atomically modifying the doubly linked list data structure includes the step of:
updating, as the doubly linked list data structure, a doubly linked list shared data structure in an atomic manner.

16. The method of claim 15 wherein the doubly linked list shared data structure includes multiple entries, wherein the modify command is a remove instruction, and wherein the step of updating the doubly linked list shared data structure includes the step of:
removing an entry from the doubly linked list shared data structure in response to the remove instruction.

17. The method of claim 15 wherein the doubly linked list shared data structure includes multiple entries, wherein the modify command is an add instruction, and wherein the step of updating the doubly linked list shared data structure includes the step of:
adding an entry to the doubly linked list shared data structure in response to the add instruction.

18. The method of claim 15 wherein the doubly linked list shared data structure includes multiple entries, wherein the modify command is a move instruction, and wherein the step of updating the doubly linked list shared data structure includes the step of:
moving an entry from a first position in the doubly linked list shared data structure to a second position in the doubly linked list shared data structure in response to the move instruction.

19. The method of claim 15 wherein the step of updating the doubly linked list shared data structure includes the step of:
performing a series of individual transactions on the doubly linked list shared data structure, and
wherein the step of providing the result includes the step of:
outputting, as the result, a series of transaction outputs respectively corresponding to the series of individual transactions.

20. The method of claim 19 wherein the series of transaction outputs provided by the memory board control circuit includes a first transaction output and a second transaction output; and wherein the method further comprises the step of:
performing an error handling routine in response to an error message from the processor resulting from (i) generation of a pseudo transaction output based on the first transaction output and (ii) a comparison of the pseudo transaction output to the second transaction output in order to error check operation of the memory board.

21. A memory board control circuit for accessing a doubly linked list data structure of a data storage system, the memory board control circuit being mountable to a memory board, the memory board control circuit comprising:
an input port that couples to a bus of the data storage system;
an output port that couples to the bus of the data storage system; and
control logic, connected to the input port and to the output port, that is configured to:
receive a modify command from a processor of a data storage system through the input port, the processor being configured to move data within the data storage system,
atomically modify the doubly linked list data structure in accordance with the modify command, and
provide a result to the processor of the data storage system through the output port in response to modifying the doubly linked list data structure.

22. The memory board control circuit of claim 21 wherein the doubly linked list is a doubly linked list shared data structure.

23. The memory board of claim 1 wherein the memory board control circuit, when atomically modifying the doubly linked list data structure in accordance with the modify command, is configured to:
change the doubly linked list data structure in a non-interruptible, single operation.

24. The memory board of claim 23 wherein the memory board control circuit, when changing the doubly linked list data structure in the non-interruptible, single operation, is configured to:
prevent execution of any overlapping context to alleviate having to coordinate modification of the doubly linked list data structure using shared data structure locking overhead operations.

25. The data storage system of claim 7 wherein the memory board control circuit, when atomically modifying the doubly linked list data structure in accordance with the modify command, is configured to:
change the doubly linked list data structure in a non-interruptible, single operation.

26. The data storage system of claim 25 wherein the memory board control circuit, when changing the doubly linked list data structure in the non-interruptible, single operation, is configured to:
prevent execution of any overlapping context to alleviate having to coordinate modification of the doubly linked list data structure using shared data structure locking overhead operations.

27. The method of claim 14 wherein the step of atomically modifying the doubly linked list data structure in accordance with the modify command includes the step of:
changing the doubly linked list data structure in a non-interruptible, single operation.

28. The method of claim 27 wherein the step of changing the doubly linked list data structure in the non-interruptible, single operation includes the step of:
preventing execution of any overlapping context to alleviate having to coordinate modification of the doubly linked list data structure using shared data structure locking overhead operations.

29. The memory board control circuit of claim 21 wherein the control logic, when atomically modifying the doubly linked list data structure in accordance with the modify command, is configured to:
change the doubly linked list data structure in a non-interruptible, single operation.

30. The memory board control circuit of claim 29 wherein the control logic, when changing the doubly linked list data structure in the non-interruptible, single operation, is configured to:
prevent execution of any overlapping context to alleviate having to coordinate modification of the doubly linked list data structure using shared data structure locking overhead operations.

31. The memory board of claim 24 wherein the modify command is a single communication between the processor and the memory board over the bus; and wherein the memory board control circuit, when preventing execution of any overlapping context, is configured to:
respond to the single communication between the processor and the memory board over the bus to reduce bus contention, lower latency and alleviate a need for shared data structure locking overhead.

32. The data storage system of claim 26 wherein the modify command is a single communication between the processor and the memory board over the bus; and wherein the memory board control circuit, when preventing execution of any overlapping context, is configured to:
respond to the single communication between the processor and the memory board over the bus to reduce bus contention, lower latency and alleviate a need for shared data structure locking overhead.

33. The method of claim 28 wherein the modify command is a single communication between the processor and the memory board over the bus; and wherein preventing execution includes:
responding to the single communication between the processor and the memory board over the bus to reduce bus contention, lower latency and alleviate a need for shared data structure locking overhead.

34. The memory board control circuit of claim 30 wherein the modify command is a single communication between the processor and the memory board control circuit over the bus; and wherein the control logic, when preventing execution of any overlapping context, is configured to:
respond to the single communication between the processor and the memory board control circuit over the bus to reduce bus contention, lower latency and alleviate a need for shared data structure locking overhead.

* * * * *